United States Patent
Clamen et al.

(10) Patent No.: US 7,199,179 B2
(45) Date of Patent: Apr. 3, 2007

(54) CURABLE AQUEOUS COMPOSITION AND USE AS HEAT-RESISTANT NONWOVEN BINDER

(75) Inventors: Guy Clamen, Opio (FR); Richard Dobrowolski, Cheltenham, PA (US); Hal Conley Morris, Abington, PA (US); Barry Weinstein, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 393 days.

(21) Appl. No.: 10/806,580

(22) Filed: Mar. 23, 2004

(65) Prior Publication Data
US 2005/0048212 A1    Mar. 3, 2005

(30) Foreign Application Priority Data
Aug. 26, 2003   (EP) .................................. 03292103

(51) Int. Cl.
*C08F 220/10*   (2006.01)
(52) U.S. Cl. .................. 524/560; 524/556; 525/55
(58) Field of Classification Search ............... 524/560, 524/556; 525/55
See application file for complete search history.

(56) References Cited

U.S. PATENT DOCUMENTS

| | | | |
|---|---|---|---|
| 4,384,056 A | 5/1983 | Schmidt et al. | 523/221 |
| 4,576,987 A | 3/1986 | Crockatt et al. | 524/487 |
| 4,610,920 A * | 9/1986 | Mudge et al. | 442/118 |
| 4,681,910 A | 7/1987 | Crockatt et al. | 524/487 |
| 5,037,873 A | 8/1991 | Heaton | 524/267 |
| 5,318,990 A | 6/1994 | Strauss | 524/549 |
| 5,421,866 A | 6/1995 | Stark-Kasley et al. | 106/2 |
| 5,427,587 A | 6/1995 | Arkens et al. | 8/116.1 |
| 5,661,213 A | 8/1997 | Arkens et al. | 524/555 |
| 5,718,728 A | 2/1998 | Arkens et al. | 8/116.1 |
| 5,763,524 A | 6/1998 | Arkens et al. | 524/549 |
| 5,977,232 A * | 11/1999 | Arkens et al. | 524/404 |
| 6,071,994 A | 6/2000 | Hummerich et al. | 524/247 |
| 6,136,916 A | 10/2000 | Arkens et al. | 524/556 |
| 6,155,305 A | 12/2000 | Sumner | 138/149 |
| 6,221,973 B1 | 4/2001 | Arkens et al. | 525/327.7 |
| 6,241,780 B1 | 6/2001 | Arkens et al. | 8/116.1 |

* cited by examiner

*Primary Examiner*—David W. Wu
*Assistant Examiner*—Satya B. Sastri
(74) *Attorney, Agent, or Firm*—Andrew E. C. Merriam

(57) ABSTRACT

A curable aqueous composition including (a) a polyacid including at least two carboxylic acid groups, anhydride groups, or salts thereof; (b) a polyol including at least two hydroxyl groups; and (c) an emulsion polymer including, as copolymerized units, greater than 30% by weight, based on the weight of the emulsion polymer solids, ethylenically unsaturated acrylic monomer including a $C_5$ or greater alkyl group; wherein the ratio of the number of equivalents of the carboxylic acid groups, anhydride groups, or salts thereof to the number of equivalents of the hydroxyl groups is from 1/0.01 to 1/3, and wherein the carboxylic acid groups, anhydride groups, or salts thereof are neutralized to an extent of less than 35% with a fixed base is provided. Also provided is a method for treating heat-resistant fibers or a heat-resistant nonwoven formed therefrom with the curable aqueous composition and the article prepared thereby.

10 Claims, No Drawings

CURABLE AQUEOUS COMPOSITION AND USE AS HEAT-RESISTANT NONWOVEN BINDER

This application claims the foreign priority benefit of European Patent Application No. 03292103.3, filed Aug. 26, 2003.

This invention relates to a curable aqueous composition and the use thereof as a binder for heat-resistant fibers and nonwovens. In particular the present invention relates to a curable aqueous composition including (a) a polyacid comprising at least two carboxylic acid groups, anhydride groups, or salts thereof; (b) a polyol comprising at least two hydroxyl groups; and (c) an emulsion polymer comprising, as copolymerized units, greater than 30% by weight, based on the weight of the emulsion polymer solids, ethylenically unsaturated acrylic monomer comprising a $C_5$ or greater alkyl group; wherein the ratio of the number of equivalents of the carboxylic acid groups, anhydride groups, or salts thereof to the number of equivalents of the hydroxyl groups is from 1/0.01 to 1/3, and wherein the carboxylic acid groups, anhydride groups, or salts thereof are neutralized to an extent of less than 35% with a fixed base. The present invention also relates to a method for treating heat-resistant fibers or nonwovens with the curable aqueous composition, and a heat resistant nonwoven so prepared. The cured composition can be used as a binder for nonwovens composed of fiberglass or other heat-resistant fibers.

There has long been a need for a curable composition, particularly for a composition which contains or emits, on storage or during curing, for example, little or, preferably, no formaldehyde, because of existing and proposed legislation directed to the lowering or elimination of formaldehyde, while providing an effective level of curing at a temperature and for a time acceptable for the substrate to be treated and consistent with the lowest practical level of energy usage during processing.

U.S. Pat. Nos. 5,427,587 and 5,661,213 disclose a formaldehyde-free curable composition and the use thereof as a binder for heat-resistant nonwovens and cellulosic substrates. The composition includes (a) a polyacid bearing at least two carboxylic acid groups, anhydride groups, or the salts thereof; (b) a polyol bearing at least two hydroxyl groups; and (c) a phosphorous-containing accelerator, wherein the ratio of the number of equivalents of the carboxylic acid groups, anhydride groups, or salts thereof to the number of equivalents of the hydroxyl groups is from 1/0.01 to 1/3, and wherein the carboxyl groups, anhydride groups, or salts thereof are neutralized to an extent of less than 35% with a fixed base.

A higher level of water-proofing of heat-resistant nonwovens than provided by the disclosed technology is still desirable. The curable aqueous compositions of the present invention can provide such performance.

According to a first aspect of the present invention there is provided a curable aqueous composition comprising:

(a) a polyacid comprising at least two carboxylic acid groups, anhydride groups, or salts thereof;

(b) a polyol comprising at least two hydroxyl groups; and (c) an emulsion polymer comprising, as copolymerized units, greater than 30% by weight, based on the weight of said emulsion polymer solids, ethylenically unsaturated acrylic monomer comprising a $C_5$ or greater alkyl group; wherein the ratio of the number of equivalents of said carboxylic acid groups, anhydride groups, or salts thereof to the number of equivalents of said hydroxyl groups is from 1/0.01 to 1/3, and wherein said carboxylic acid groups, anhydride groups, or salts thereof are neutralized to an extent of less than 35% with a fixed base.

According to a second aspect of the present invention there is provided a method for treating a heat-resistant fibers or a heat-resistant nonwoven formed therefrom comprising:

(a) forming a curable aqueous composition comprising admixing (1) a polyacid comprising at least two carboxylic acid groups, anhydride groups, or salts thereof;

(2) a polyol comprising at least two hydroxyl groups; and (3) an emulsion polymer comprising, as copolymerized units, greater than 30% by weight, based on the weight of said emulsion polymer solids, ethylenically unsaturated acrylic monomer comprising a $C_5$ or greater alkyl group; wherein the ratio of the number of equivalents of said carboxylic acid groups, anhydride groups, or salts thereof to the number of equivalents of said hydroxyl groups is from 1/0.01 to 1/3, and wherein said carboxylic acid groups, anhydride groups, or salts thereof are neutralized to an extent of less than 35% with a fixed base; and (b) contacting said heat-resistant fibers or a heat-resistant nonwoven formed therefrom with said curable aqueous composition; and (c) heating said curable aqueous composition at a temperature of from 120° C. to 400° C.

According to a third aspect of the present invention there is provided a heat-resistant nonwoven prepared by the method of the second aspect of the present invention.

The curable aqueous composition of the present invention includes a polyacid. The polyacid must be sufficiently nonvolatile that it will substantially remain available for reaction with the polyol in the composition during heating and curing operations. The polyacid can be a compound with a molecular weight less than 1000 bearing at least two carboxylic acid groups, anhydride groups, or salts thereof such as, for example, citric acid, butane tricarboxylic acid, and cyclobutane tetracarboxylic acid or it can be an addition polymer or oligomer including, as polymerized units, carboxylic acid-functional monomers. The addition polymer can be in the form of a solution of the addition polymer in an aqueous medium such as, for example, an alkali-soluble resin which has been solubilized in a basic medium; in the form of an aqueous dispersion such as, for example, an emulsion-polymerized dispersion; or in the form of an aqueous suspension. "Aqueous" herein includes water and mixtures composed predominantly of water admixed with water-miscible solvents.

The addition polymer must contain at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from 25% to 100%, by weight, based on the weight of the addition polymer, can be used. Additional ethylenically unsaturated monomer can include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes;

butadiene; vinyl acetate or other vinyl esters; acrylonitrile or methacrylonitrile; and the like.

The addition polymer containing at least two carboxylic acid groups, anhydride groups, or salts thereof can have a molecular weight from 300 to 10,000,000. Preferred is a molecular weight from 500 to 250,000. When the addition polymer is an alkali-soluble resin having a carboxylic acid, anhydride, or salt thereof, content of from 5% to 30%, by weight based on the total weight of the addition polymer, a molecular weight from 500 to 20,000 is preferred, higher molecular weight alkali-soluble resins can lead to curable compositions which exhibit excessive viscosity.

When the addition polymer is in the form of an aqueous dispersion or an aqueous suspension and low levels of precrosslinking or gel content are desired, low levels of multi-ethylenically unsaturated monomers such as, for example, allyl methacrylate, diallyl phthalate, 1,4-butylene glycol dimethacrylate, 1,6-hexanedioldiacrylate, and the like, can be used at a level of from 0.01% to 5%, by weight based on the weight of the addition copolymer.

When the addition polymer is in the form of an aqueous dispersion the diameter of the addition polymer particles can be from 80 nanometers to 1000 nanometers, as measured using a Brookhaven BI-90 Particle Sizer, which employs a light scattering technique. However, polymodal particle size distributions such as those disclosed in U.S. Pat. Nos. 4,384,056 and 4,539,361, hereby incorporated herein by reference, can be employed.

When the addition polymer is in the form of an aqueous dispersion the addition polymer particles can be made up of two or more mutually incompatible copolymers. These mutually incompatible copolymers can be present in various morphological configurations such as, for example, core/shell particles, core/shell particles with shell phases incompletely encapsulating the core, core/shell particles with a multiplicity of cores, interpenetrating network particles, and the like.

The addition polymer can be prepared by solution polymerization, emulsion polymerization, or suspension polymerization techniques for polymerizing ethylenically-unsaturated monomers which are well known in the art. When it is desired to use emulsion polymerization, anionic or nonionic surfactants, or mixtures thereof, can be used. The polymerization can be carried out by various means such as, for example, with all of the monomer in the reaction kettle at the beginning of the polymerization reaction, with a portion of the monomer in emulsified form present in the reaction kettle at the beginning of the polymerization reaction, and with a small particle size emulsion polymer seed present in the reaction kettle at the beginning of the polymerization reaction.

The polymerization reaction to prepare the addition polymer can be initiated by various methods known in the art such as, for example, by using the thermal decomposition of an initiator and by using an oxidation-reduction reaction ("redox reaction") to generate free radicals to effect the polymerization. In another embodiment the addition polymer can be formed in the presence of phosphorous-containing chain transfer agents such as, for example, hypophosphorous acid and its salts, as is disclosed in U.S. Pat. Nos. 5,077,361 and 5,294,686, so as to incorporate the phosphorous-containing accelerator and the polyacid component in the same molecule. The polymer can be prepared in solvent/water mixtures such as, for example, i-propanol/water, tetrahydrofuran/water, and dioxane/water; preferred is an i-propanol/water mixture.

Chain transfer agents such as mercaptans, polymercaptans, and halogen compounds can be used in the polymerization mixture in order to moderate the molecular weight of the acrylic emulsion copolymer. Generally, from 0% to 1% by weight, based on the weight of the polymeric binder, of $C_4$–$C_{20}$ alkyl mercaptans, mercaptopropionic acid, or esters of mercaptopropionic acid, can be used.

The carboxyl groups of the polyacid component of the curable aqueous composition are neutralized with fixed base to an extent of less than 35%, calculated on an equivalents basis. Contacting the addition polymer component before, during, or after the preparation of the curable aqueous composition, the addition polymer containing two carboxylic acid groups, anhydride groups, or the salts thereof, defined as neutralization herein, with a fixed base is required prior to treating a nonwoven substrate. Neutralization of less than 35% of the carboxylic acid groups, calculated on an equivalents basis, with a fixed base is required. Neutralization of less than 20% of the carboxylic acid groups, calculated on an equivalents basis, with a fixed base is preferred. Neutralization of less than 5% of the carboxylic acid groups, calculated on an equivalents basis, with a fixed base is more preferred. When the half ester of a dicarboxylic acid or the anhydride of a dicarboxylic acid is used, the equivalents of acid are calculated to be equal to those of the corresponding dicarboxylic acid.

"Fixed base", or "permanent base", as used herein, refers to a monovalent base which is substantially non-volatile under the conditions of the treatment such as, for example, sodium hydroxide, potassium hydroxide, sodium carbonate, or t-butylammonium hydroxide. The fixed base must be sufficiently nonvolatile that it will substantially remain in the composition during heating and curing operations. Volatile bases such as, for example, ammonia or volatile lower alkyl amines, do not function as the fixed base of this invention, but can be used in addition to the fixed base; they do not contribute to the required degree of neutralization by a fixed base. Fixed multivalent bases such as, for example, calcium carbonate can tend to destabilize an aqueous dispersion, if the addition polymer is used in the form of an aqueous dispersion, but can be used in minor amount.

The curable aqueous composition also contains a polyol containing at least two hydroxyl groups. The polyol must be sufficiently nonvolatile that it will substantially remain available for reaction with the polyacid in the composition during heating and curing operations. The polyol can be a compound with a molecular weight less than 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, β-hydroxyalkylamides such as, for example, bis-[N,N-di(β-hydroxyethyl)] adipamide, as can be prepared according to the teachings of U.S. Pat. No. 4,076,917. In certain embodiments the polyol can be an addition polymer containing at least two hydroxyl groups such as, for example, polyvinyl alcohol, partially hydrolyzed polyvinyl acetate, and homopolymers or copolymers of hydroxyethyl (meth)acrylate, hydroxypropyl (meth)acrylate, a hydroxyl group-bearing monomer of Formula I,

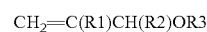   (I)

wherein R1 and R2 are independently selected from hydrogen, methyl, and —CH2OH; and R3 is selected from hydrogen, —CH2CH(CH3)OH, —CH2CH2OH and (C3–C12) polyol residues; or of Formula II,

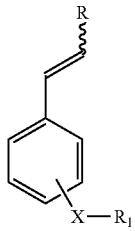

(II)

wherein R is selected from $CH_3$, Cl, Br, and $C_6H_5$; and R1 is selected from H, OH, $CH_2OH$, $CH(CH_3)OH$, glycidyl, $CH(OH)CH_2OH$, and $(C_3-C_{12})$polyol residues; and the like. Preferred addition polymer polyols include, as copolymerized units, allyl alcohol or 3-allyloxy-1,2-propanediol.

The curable aqueous composition also contains an emulsion polymer including, as copolymerized units, greater than 30%, preferably greater than 40%, more preferably greater than 50%, and even more preferably greater than 60%, by weight, based on the weight of the emulsion polymer solids, of an ethylenically unsaturated acrylic monomer including a $C_5$ or greater alkyl group. By "emulsion polymer" herein is meant a polymer dispersed in an aqueous medium that has been prepared by emulsion polymerization. By "acrylic monomer including a $C_5$ or greater alkyl group" herein is meant an acrylic monomer bearing an aliphatic alkyl group having five or more C atoms, the alkyl group including n-alkyl, s-alkyl, i-alkyl, and t-alkyl groups. Suitable ethylenically unsaturated monomers including a $C_5$ or greater alkyl group include $(C_5-C_{30})$ alkyl esters of (meth)acrylic acid, such as amyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate; unsaturated vinyl esters of (meth)acrylic acid such as those derived from fatty acids and fatty alcohols; surfactant monomers including long chain alkoxy- or alkylphenoxy (polyalkylene oxide) (meth)acrylates, such as $C_{18}H_{37}$-(ethylene oxide)$_{20}$ methacrylate and $C_{12}H_{25}$-(ethylene oxide)$_{23}$ methacrylate; N-alkyl substituted (meth)acrylamides such as octyl acrylamide; and the like. The monomer including a $C_5$ or greater alkyl group can also contain functionality, such as amido, aldehyde, ureido, polyether and the like, but preferably does not contain an acid or hydroxy group. Emulsion polymers containing such monomers can be prepared by emulsion polymerization, preferably by the method for forming polymers of U.S. Pat. No. 5,521,266.

The emulsion polymer can also include, as copolymerized units, from 0% to 10%, preferably from 0% to 5%, by wt based on the weight of the emulsion polymer solids, monomer bearing a carboxylic acid group, anhydride group, or salt thereof or hydroxyl-group, such as (meth)acrylic acid and hydroxyethyl(meth)acrylate.

The emulsion polymer is present in an amount of from 1% to 10%, preferably from 1.5% to 5%, by weight based on the sum of the weight of the polyacid and the weight of the polyol, all weights being taken on a solids basis.

The ratio of the number of equivalents of carboxy, anhydride, or salts thereof to the number of equivalents of hydroxyl is from 1/0.01 to 1/3. The equivalents of carboxy, anhydride, or salts thereof and the number of equivalents of hydroxyl are those in the entire curable aqueous composition. An excess of equivalents of carboxy, anhydride, or salts thereof to the equivalents of hydroxyl is preferred. The more preferred ratio of the number of equivalents of carboxy, anhydride, or salts thereof to the number of equivalents of hydroxyl is from 1/0.2 to 1/1. The most preferred ratio of the number of equivalents of carboxy, anhydride, or salts thereof to the number of equivalents of hydroxyl is from 1/0.2 to 1/0.8.

In certain embodiments the curable aqueous composition can include a Phosphorous-containing species which can be a Phosphorous-containing compound such as, for example, an alkali metal hypophosphite salt, an alkali metal phosphite, an alkali metal polyphosphate, an alkali metal dihydrogen phosphate, a polyphosphoric acid, and an alkyl phosphinic acid or it can be an oligomer or polymer bearing Phosphorous-containing groups such as, for example, an addition polymer of acrylic and/or maleic acid formed in the presence of sodium hypophosphite, addition polymers such as, for example, the polymer of the present invention prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing species can be used at a level of from 0% to 40%, preferably from 0% to 5%, further preferably from 0% to 2.5%, more preferably from 0% to 1%, and further more preferably from 0% to 0.5% by weight based on the weight of the polymer of the present invention.

The curable aqueous composition can contain, in addition, conventional treatment components such as, for example, emulsifiers, pigments, fillers or extenders, anti-migration aids, curing agents, coalescents, surfactants, particularly nonionic surfactants, biocides, plasticizers, organosilanes, anti-foaming agents, corrosion inhibitors, particularly corrosion inhibitors effective at pH<4 such as thioureas, oxalates, and chromates, colorants, waxes, polyols which are not polymers of the present invention such as glycerol, alkanolamines, and polypropyleneglycol, other polymers not of the present invention, and anti-oxidants.

In some embodiments alkanolamines are included in the curable aqueous composition. In certain embodiments the salts of the carboxy-group are salts of functional alkanolamines with at least two hydroxyl groups such as, for example, diethanolamine, triethanolamine, dipropanolamine, and di-isopropanolamine. In another embodiment a carboxyl- or anhydride-containing addition polymer and a polyol can be present in the same addition polymer, which addition polymer would contain both carboxyl, anhydride, or salts thereof functionality and hydroxyl functionality. In an additional embodiment the polyol and the optional phosphorous-containing accelerator can be present in the same addition polymer, which addition polymer can be mixed with a polyacid. In yet another embodiment the carboxyl- or anhydride-containing addition polymer, the polyol, and the optional phosphorous-containing accelerator can be present in the same addition polymer. Other embodiments will be apparent to one skilled in the art. As disclosed herein-above, the carboxyl groups of the polymer can be neutralized to an extent of less than 35% with a fixed base before, during, or after the mixing to provide the aqueous composition. Neutralization can be partially effected during the formation of the polymer.

The curable aqueous composition of the present invention is preferably a formaldehyde-free curable composition. By "formaldehyde-free composition" herein is meant that the composition is substantially free from formaldehyde, nor does it liberate substantial formaldehyde as a result of drying and/or curing. In order to minimize the formaldehyde content of the curable composition it is preferred, when preparing a polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. By "substantially free from formaldehyde" herein is meant that when low levels of formaldehyde are acceptable in the waterborne composition or when compelling reasons exist for using adjuncts which generate or emit formaldehyde, substantially formaldehyde-free waterborne compositions can be used.

The curable aqueous composition is typically formed by adding the emulsion polymer to a mixture of the polyacid and the polyol, which mixture is typically at a pH of from 2.0 to 4.5. Agglomeration of the emulsion polymer under these conditions can occur if the emulsion polymer is not sufficiently stable; agglomeration is believed to be undesirable for processing and efficiency reasons. In order to achieve stability under these conditions in some embodiments it is optionally preferred to add a surfactant to the emulsion polymer before or during the addition of the emulsion polymer to the mixture of the polyacid and the polyol. Preferred is the addition of from 0.5% to 20%, preferably from 2% to 10%, by weight, based on the weight of emulsion polymer solids. Preferred is a surfactant having a HLB value of greater than 15.

In one aspect of the present invention a method for treating a substrate with the curable aqueous composition of the present invention is provided. Such treatments can be commonly described as, for example, coating, sizing, saturating, bonding, combinations thereof, and the like. Typical substrates include wood such as wood particles, fibers, chips, flour, pulp, and flakes; metal; plastic; fibers such as glass fibers; woven and nonwoven fabrics; and the like. The curable aqueous composition can be applied to a substrate by conventional techniques such as, for example, air or airless spraying, padding, saturating, roll coating, curtain coating, beater deposition, coagulation, or the like.

In one embodiment of this invention the curable aqueous composition can be used as a binder for heat-resistant nonwoven fabrics such as, for example, nonwovens which contain heat-resistant fibers such as, for example, aramid fibers, ceramic fibers, metal fibers, carbon fibers, polyimide fibers, certain polyester fibers, rayon fibers, rock wool, and glass fibers. By "heat-resistant fibers" herein is meant fibers which are substantially unaffected by exposure to temperatures above 125° C. Heat-resistant nonwovens can also contain fibers which are not in themselves heat-resistant such as, for example, certain polyester fibers, rayon fibers, nylon fibers, and superabsorbent fibers, in so far as they do not materially adversely affect the performance of the substrate.

Nonwoven fabrics are composed of fibers which can be consolidated by purely mechanical means such as, for example, by entanglement caused by needle-punching, by an air-laid process, and by a wet-laid process; by chemical means such as, for example, treatment with a polymeric binder; or by a combination of mechanical and chemical means before, during, or after nonwoven fabric formation. Some nonwoven fabrics are used at temperatures substantially higher than ambient temperature such as, for example, glass fiber-containing nonwoven fabrics which are impregnated with a hot asphaltic composition pursuant to making roofing shingles or roll roofing material. When a nonwoven fabric is contacted with a hot asphaltic composition at temperatures of from 150° C. to 250° C., the nonwoven fabric can sag, shrink, or otherwise become distorted. Therefore, nonwoven fabrics which incorporate a curable composition should substantially retain the properties contributed by the cured aqueous composition such as, for example, tensile strength. In addition, the cured composition should not substantially detract from essential nonwoven fabric characteristics, as would be the case, for example, if the cured composition were too rigid or brittle or became sticky under processing conditions.

The curable aqueous composition, after it is applied to a substrate, is heated to effect drying and curing. The duration and temperature of heating will affect the rate of drying, processability, handleability; and property development of the treated substrate. Heat treatment at from 120° C. to 400° C. for a period of time between from 3 seconds to 15 minutes can be carried out; treatment at from 175° C. to 225° C. is preferred. By "curing" is meant herein a chemical or morphological change which is sufficient to alter the properties of the polymer such as, for example, via covalent chemical reaction, ionic interaction or clustering, improved adhesion to the substrate, phase transformation or inversion, hydrogen bonding, and the like. The drying and curing functions can be effected in two or more distinct steps, if desired. For example, the composition can be first heated at a temperature and for a time sufficient to substantially dry but not to substantially cure the composition and then heated for a second time at a higher temperature and/or for a longer period of time to effect curing. Such a procedure, referred to as "B-staging", can be used to provide binder-treated nonwoven, for example, in roll form, which can at a later stage be cured, with or without forming or molding into a particular configuration, concurrent with the curing process.

The heat-resistant nonwovens can be used for applications such as, for example, insulation batts or rolls, as reinforcing mat for roofing or flooring applications, as roving, as microglass-based substrate for printed circuit boards or battery separators, as filter stock, as tape stock, and as reinforcement scrim in cementitious and non-cementitious coatings for masonry.

The following examples are intended to illustrate the curable composition and the use thereof in the method for treating substrates.

EXAMPLES 1–8 and COMPARATIVE EXAMPLES A–G

Emulsion polymers of the compositions listed in Table 1.1 at 5 wt % solids based on polyacid+polyol were added to a solution containing a mixture of a polyacrylic acid and a polyol with the optional addition of sulfuric acid to yield a concentrated solution (>40% solids) at pH 2.8–4.5. The stability of the emulsion polymer as indicated by agglomeration in the formulation was noted. In some instances additional surfactant was added to the hydrophobic acrylic latex to stabilize them to agglomeration particularly in concentrated low pH formulation. Next the formulation was diluted with water to 5% solids. Glass microfiber filter paper sheets (20.3×25.4 cm, Cat No. 1820 866, Whatman International Ltd., Maidstone, England) were dipped in binder solution and run through a roll padder with roll pressures of 22 kg (10 lbs). The coated sheets were then dried at 90° C. for 90 sec in a Mathis oven. Dried sheets were then cured in a Mathis oven at 210° C. for 1 minute. The total add-on was from 10% to 11 wt % curable composition solids based on fiberglass solids. The sheets were cooled to room temperature and water was added drop-wise and in portions across the paper surface. The wetting of the coated fiberglass filter paper samples were compared to a control which did not contain an emulsion polymer. The surface wetting was assigned a value based on the observed wetting.

Ratings:
0=readily adsorbed into fiberglass paper
1=initial resists adsorptions for seconds but wets in less than 1 minute
3=resists adsorptions for 10 minutes
4=resists adsorption for 20 minutes
5=resists water adsorption over an extended period of time (i.e. 24 hrs)

TABLE 1.1

Curable aqueous compositions and Property Evaluations

| EXAMPLE | Sample Composition | Stability in Formulation | Stability in acidified Formulation | water-proofing |
|---|---|---|---|---|
| 1 | 63 STY/33EHA/4 AA | Yes | No | 4 |
| Comp. A | 40.9 MMA/29.9 STY/20.0 BA/9.0 MAA | Yes | No | 1 |
| Comp. B | 47.0 MMA/25.0 BA/17.9 MAA/10.0 HEMA | Yes | Yes | 1 |
| Comp. C | 75.9 BA/18.9 STY/5.0 AA | Yes | No | 3 |
| Comp. D | 42.5 BA/37.5 STY/13.5 MMA/5.0 HEMA/1.5 AA | Yes | Yes | 1 |
| 2 | 60 MMA/39.EHA/1 MAA | Yes | Yes | 4 |
| 3 | 35 LMA/32.0 BA/32 MMA/1.0 MAA | Yes | No | 5 |
| 4 | 31 CEMA/49 BA/19 MMa/1 MAA | Yes | No | 5 |
| 5 | 79.9 EHA/20.0 AA | Yes | Yes | 5 |
| 6 | 80 CEMA/20 AA | Yes | No | 5 |
| 7 | 60.0 EHA/19.9 MMA/19.9 STY | Yes | No | 5 |
| 8 | 67.2 EHA/25.0 BA/6.0 MMA/1.6 MAA | Yes | No | 4 |
| Comp. E | 94 MMA/5 BA/1 MAA | Yes | No | 1 |
| Comp. F | 35 BA/25 MMA/15 MAA/15 HEMA/10 STY | Yes | Yes | 0 |
| Comp. G | 58 MMA/41 BA/1 MAA | Yes | Yes | 1 |

Examples 1–8 of the present invention exhibit superior waterproofing ratings compared to those of Comparative Examples A–G

What is claimed is:

1. A curable aqueous composition comprising
   (a) a polyacid comprising at least two carboxylic acid groups, anhydride groups, or salts thereof;
   (b) a polyol comprising at least two hydroxyl groups; and
   (c) an emulsion polymer comprising, as copolymerized units, greater than 30% by weight, based on the weight of said emulsion polymer solids, ethylenically unsaturated acrylic monomer comprising a $C_5$ or greater alkyl group;
   wherein the ratio of the number of equivalents of said carboxylic acid groups, anhydride groups, or salts thereof to the number of equivalents of said hydroxyl groups is from 1/0.01 to 1/3.

2. The curable aqueous composition of claim 1 wherein said polyacid is an addition polymer comprising at least one copolymerized ethylenically unsaturated carboxylic acid-containing monomer.

3. The curable aqueous composition of claim 1 wherein said polyol is a compound with a molecular weight less than 1000 bearing at least two hydroxyl groups.

4. The curable aqueous composition of claim 3 wherein said polyol is a hydroxylamine selected from the group consisting of diisopropanolamine, 2-(2-aminoethylamino) ethanol, triethanolamine, tris(hydroxymethyl)aminomethane, and diethanolamine.

5. The curable aqueous composition of claim 1 wherein said emulsion polymer is present in an amount of from 1% to 20%, by weight based on the sum of the weight of the polyacid and the weight of the polyol, all weights being taken on a solids basis.

6. The curable aqueous composition of claim 1 further comprising a Phosphorous-containing species.

7. The curable aqueous composition of claim 1 further comprising from 0.5% to 20% by weight, based on the solids content of said emulsion polymer, surfactant having an HLB value of greater than 15.

8. A method for treating a substrate comprising:
   (a) forming a curable aqueous composition comprising admixing
      (1) a polyacid comprising at least two carboxylic acid groups, anhydride groups, or salts thereof;
      (2) a polyol comprising at least two hydroxyl groups; and
      (3) an emulsion polymer comprising, as copolymerized units, greater than 30% by weight, based on the weight of said emulsion polymer solids, ethylenically unsaturated acrylic monomer comprising a $C_5$ or greater alkyl group;
   wherein the ratio of the number of equivalents of said carboxylic acid groups, anhydride groups, or salts thereof to the number of equivalents of said hydroxyl groups is from 1/0.01 to 1/3, and
   (a) contacting said substrate with said curable aqueous composition; and
   (b) heating said curable aqueous composition at temperature of from 120° C. to 400° C.

9. The method of claim 8 wherein said substrate is a heat-resistant fiber or a heat-resistant nonwoven formed therefrom.

10. A heat-resistant nonwoven prepared by the method of claim 9.

* * * * *